United States Patent [19]

Sacher

[11] Patent Number: 4,465,621

[45] Date of Patent: Aug. 14, 1984

[54] IMMERSION OIL FOR MICROSCOPY AND RELATED APPLICATIONS

[75] Inventor: Robert Sacher, Newton, N.J.

[73] Assignee: R. P. Cargille Laboratories, Inc., Cedar Grove, N.J.

[21] Appl. No.: 510,069

[22] Filed: Jul. 1, 1983

[51] Int. Cl.³ .................. C09K 3/00; G02B 1/06
[52] U.S. Cl. .................. 252/582; 252/408.1; 252/1; 252/364; 350/418
[58] Field of Search .............. 252/582, 408.1, 1, 364; 350/418

[56] References Cited

U.S. PATENT DOCUMENTS

| 3,929,667 | 12/1975 | Bautis | 252/408.1 |
| 3,979,301 | 9/1976 | Ushioda et al. | 252/408.1 |
| 4,108,794 | 8/1978 | Yonekubo | 252/1 |
| 4,248,929 | 2/1981 | Morgan et al. | 428/288 |
| 4,282,286 | 8/1981 | Sahara | 428/339 |

*Primary Examiner*—Benjamin R. Padgett
*Assistant Examiner*—Anne Brookes
*Attorney, Agent, or Firm*—Arthur L. Plevy

[57] ABSTRACT

An immersion oil formulation for use in microscopy and related optical fields consists of a blend of a dialkyl phthalate, a butyl benzyl phthalate and chlorinated paraffin. The compounds, when blended, possess a desired optical property including a refractive index of 1.518 or thereabouts and an extremely low fluorescence enabling the immersion oil to be utilized in the field of fluorescence microscopy. The resultant blend also possesses a low toxicity and therefore eliminates all the disadvantages of prior art immersion oils which contain PCBs or which exhibit undesirably high auto fluorescence.

6 Claims, No Drawings

IMMERSION OIL FOR MICROSCOPY AND RELATED APPLICATIONS

BACKGROUND OF THE INVENTION

This invention relates to an immersion oil formulation and more particularly to a low fluorescence immersion oil.

An immersion oil is used in microscopy and in other optical fields to fill some of the spaces in the optical system that would otherwise by filled with air or some other substance. The function of the immersion oil is to improve the quality of the light passing through the system.

In microscopy the primary use is to fill the gaps between a microscope oil immersion objective lens and the cover glass of the slide being viewed. The microscope and oil immersion objective are designed according to specified optical requirements for the immersion oil so that the image seen through the microscope will be of higher solution and brighter than is normally possible without the oil immersion system. In a similar manner optical coupling which may include the connection of optical fibers, lenses, flats and so on have similar requirements for immersion oils as those of the microscope manufacturers.

The most common optical requirements of an immersion oil for microscopy are a refractive index of 1.518 (5461 angstrom light) a dispersion value as expressed by a Abbe V of 44. Another common requirement is that the oil have low auto fluorescence. Prior to the ban of polychlorinated biphenyls (PCBs) by the U.S. Environmental Protection Agency, the vast majority of immersion oils were based on PCBs because of it desirable optical properties, stability and low auto fluorescence. Due to the ban, typical other types of immersion oils were formulated in an attempt to solve these problems.

See for example U.S. Pat. No. 3,929,667 issued on Dec. 30, 1975 to A Bautis and entitled IMMERSION OIL FORMULATIONS FOR USE IN MICROSCOPY AND SIMILAR FIELDS and assigned to the assignee herein. In any event, the reformulated immersion oils were inferior in some respects to their PCB counterparts particularly in regard to low auto fluorescence which is essential to fluorescent microscopy techniques. It is therefore an object of the present invention to provide a new and improved immersion oil possessing all the necessary optical characteristics of prior immersion oils while providing low fluorescence properties.

BRIEF DESCRIPTION OF THE PREFERRED EMBODIMENT

An immersion oil for use in the field of microscopy and related fields thereto, comprising at least a butyl benzyl phthalate blended with another substance to provide an immersion oil having a refractive index in the range between 1.49 to 1.53.

DETAILED DESCRIPTION OF THE INVENTION

Fluorescence is the property of a material which when illuminated by light of one wave length fluoresces or emits light of another wave length. In fluorescent microscopy it is the fluorescence of the specimen that is viewed. In such systems if the immersion oil used also fluoresces, this causes interfering background fluorescences which can serve to obscure the actual fluorescence of the object or specimen. This creates a greater problem in the use of immersion oils in the field of fluorescent microscopy. It has been determined that a formulation for an immersion oil which contains a dialkyl phthalate, a butyl benzyl phthalate and a chlorinated paraffin can provide an immersion oil which has a low auto fluorescence and which is capable of providing a refractive index within the proper range.

Dialkyl phthalate and butyl benzyl phthalate both have very low auto fluorescence and, when blended, cover a refractive index range of 1.48 to 1.53. As can be ascertained, the optical dispersion of the blend is too high for most immersion oil needs, so a chlorinated paraffin can be added to decrease the dispersion a desired amount. In this manner, the chlorinated paraffin is added to the formulation as will be further described.

Chlorinated paraffins, especially those containing between 50 to 70 percent by way of chlorine, have unusually low dispersion for liquids of similar refractive index and are also relatively low in auto fluorescence. In this manner they can operate as extremely suitable dispersion modifiers. Chlorinated paraffins of varying chlorine content have a variety of viscosities so that they can be used in varying proportions to modify the viscosity of the blend.

The above two phthalates and the chlorinated paraffins are of course soluable in one another and have other desirable characteristics such as low toxicity, high stability, and low color. A dialkyl phthalate with two predominately linear alkyl chains of mixed seven, nine, and eleven carbon lengths has the following characteristics:

| Refractive index at 25° C. | 1.480–1.483 |
| Molecular weight | 414 |
| Viscosity at 25° C. | 41 centistokes |
| Boiling point at 10 mm Hg | 252° C. |

Butyl benzyl phthalate has the following characteristics:

| Refractive index at 25° C. | 1.535–1.540 |
| Molecular weight | 312 |
| Viscosity at 25° C. | 41 centistokes |
| Boiling point at 10 mm Hg | 240° C. |

Chlorinated paraffins of different chlorine content:

| | APPROXIMATE PERCENT CHLORINE BY WEIGHT | | |
| --- | --- | --- | --- |
| | 50 | 60 | 70 |
| Refractive index at 25° C. | 1.516 | 1.516 | 1.548 |
| Molecular weight | 660 | 415 | 455 |
| Viscosity at 25° C. (poises) | 125 | 20 | 10,000 |
| Specific gravity 25° C./25° C. | 1.23 | 1.35 | 1.55 |

EXAMPLE 1

Most microscopists will find this blend suitable for both routine light microscopy and fluorescent microscopy. It consists of the following:

22% (by volume) butyl benzyl phthalate
20% (by volume) dialkyl phthalate
58% (by volume) 60% chlorinated paraffin

EXAMPLE 2

A useful optical coupling fluid for glass with a 1.500 refractive index:
31% (by volume) butyl benzyl phthalate
69% (by volume) dialkyl phthalate

EXAMPLE 3

A high refractive index immersion oil:
32% (by volume) butyl benzyl phthalate
68% (by volume) 60% chlorinated paraffin

TABLE OF PROPERTIES

|  | EXAMPLES | | |
| --- | --- | --- | --- |
|  | 1 | 2 | 3 |
| Refractive Index at 23° C. | | | |
| e line (5461 Å) | 1.518 | 1.503 | 1.527 |
| D line (5893 Å) | 1.515 | 1.500 | 1.524 |
| Optical Dispersion as Abbe Ve | 44.0 | 37.8 | 43.4 |
| Fluorescence (relative to PCB containing immersion oil) | equivalent | lower | equivalent |
| Viscosity at 25° C. (centistokes) | 330 | 41 | 475 |
| Density at 25° C. (gm/cc) | 1.22 | 1.01 | 1.27 |

The above formulations are given by way of an example to enable one to discern how to obtain different refractive indexes by utilizing at least the butyl benzyl phthalates in combination with either the dialkyl phthalate or the chlorinated paraffin. It is, of course, understood that the above percentages are given only by way of example and the blends can be further varied by changing the percentages to provide an immersion oil having an index of refraction within the range between 1.49 to 1.53 by varying the percentages of the above noted compounds. It is also understood that the typical immersion oil having a refractive index of 1.518 is obtained by blending the three compounds indicated to provide the immersion oil which is standardly used as having the above noted refractive index.

I claim:

1. An immersion oil for use in the field of microscopy and related fields thereto, consisting essentially of a butyl benzyl phthalate blended with at least another compound selected from the group consisting of dialkyl phthalate with predominantly linear alkyl chains of mixed seven, nine and eleven carbon lengths and chlorinated paraffin containing between 50 to 70 percent by weight of chlorine to provide an immersion oil having a refractive index in the range between 1.49 to 1.53.

2. The immersion oil according to claim 1, wherein said butyl benzyl phthalate is 31% by volume of said immersion oil blended only with said dialkyl phthalate being 69% by volume.

3. The immersion oil according to claim 1, wherein said butyl benzyl phthalate is 32% by volume of said immersion oil and blended with only said chlorinated paraffin being 68% by volume.

4. An immersion oil for use in the field of microscopy and related fields thereto, consisting essentially of a blend of dialkyl phthalate, with predominantly linear alkyl chains of mixed seven, nine and eleven carbon lengths, a butyl benzyl phthalate and a chlorinated paraffin containing between 50 to 70 percent by weight of chlorine to provide an immersion oil having a refractive index in the range between 1.49 to 1.53.

5. The immersion oil according to claim 4, wherein said dialkyl phthalate consists of about 20% by volume of said immersion, oil, with 22% by volume of said butyl benzyl phthalate and 58% by volume of said chlorinated paraffin.

6. The immersion oil according to claim 4, wherein said chlorinated paraffin contains 60 percent by weight of chlorine.

* * * * *